Patented Nov. 13, 1945

2,388,887

UNITED STATES PATENT OFFICE 2,388,887

GEL AND GELLING AGENT

Arnold Weissberger and Joseph Lee Leiserson, Rochester, N. Y., assignors to Eastman Kodak Company, Rochester, N. Y., a corporation of New Jersey No Drawing. Application May 6, 1942, Serial No. 441,998

7 Claims. (Cl. 252—316)

This invention relates to gels and to the gelling agents.

Gelation is one of the common forms of colloidal behavior and gels have been prepared from many substances. It is not unusual for hot aqueous solutions of a few percent of certain high molecular weight organic substances to give gels upon cooling. Thus, a hot two percent solution of gelatin in water forms a stiff transparent gel upon cooling to room temperature. The formation of stiff gels from dilute non-aqueous solutions is, however, comparatively rare, being almost wholly unknown among hydrocarbon and halogenated hydrocarbon solvents.

We have now found agents which give stiff gels with liquid aliphatic hydrocarbons and with certain liquid halogenated aliphatic hydrocarbons, such as carbon tetrachloride, as well as with carbon bisulfide. Moreover, our agents modify the properties of aromatic hydrocarbons, causing benzene, for example, to solidify to wax-like masses of a different nature from that of frozen benzene. Our agents may be used as plasticizers for higher molecular weight hydrocarbons and for higher molecular weight halogenated hydrocarbons and for polymers of certain types.

It is, accordingly, an object of our invention to provide gelling agents and a process for the preparation thereof. A further object is to provide hydrocarbons, halogenated hydrocarbons and other substances such as carbon bisulfide which have been modified with our gelling agents. Still other objects will become apparent hereinafter.

The gelling agents which we employ can be represented by the folowing general formula:

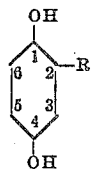

wherein R represents a secondary alkyl group of the formula $C_nH_{2n+1}$ wherein $n$ represents a positive integer of from 8 to 18. Typical examples of the agents which we employ in practicing our invention are the following:

1,4-dihydroxy-2-(2-octyl)-benzene
1,4-dihydroxy-2-(2-nonyl)-benzene
1,4-dihydroxy-2-(2-decyl)-benzene
1,4-dihydroxy-2-(2-undecyl)-benzene
1,4-dihydroxy-2-(2-dodecyl)-benzene
1,4-dihydroxy-2-(2-tetradecyl)-benzene
1,4-dihydroxy-2-(2-hexadecyl)-benzene
1,4-dihydroxy-2-(2-octadecyl)-benzene Advantageously, such compounds can be prepared, we have found, by condensing alkenes containing from 8 to 18 carbon atoms with hydroquinone in the presence of a condensing agent such as a mineral acid condensing agent, e. g., sulfuric acid or a metal halide condensing agent such as zinc or aluminum chloride. Alternatively, though less advantageously, these agents can be prepared by condensing hydroquinone with normal primary alcohols containing from 8 to 18 carbon atoms. The yields obtained by this latter method are generally inferior to the yields obtained using the alkene as a starting material.

The following examples will serve to illustrate the new agents and their manner of preparation.

Example 1

In a 1 liter, three-necked, round-bottomed flask equipped with a condenser,[1] mechanical stirrer, and thermometer a mixture of A of hydroquinone and B was heated on an oil bath to 200°. To the vigorously stirred mixture C of zinc chloride was added. The temperature was maintained at 200–210° for 3.5 hours[2] after this addition. The flask was allowed to cool and the reaction mixture washed with 200 cc. of 5 percent hydrochloric acid, and then repeatedly with water until the latter remained neutral to litmus. To the oil layer was then added 200 cc. of ether and the solution was washed with water and filtered. The ether was evaporated to give a dark oil. This material was distilled at 0.5 mm. Hg through an unpacked, indented 6 inch column. The alkyl hydroquinone distilled at D and was collected as a viscous oil, in a yield of E.

[1] Water cooled for nonyl hydroquinone to dodecyl hydroquinone inclusive, air cooled for all the others.
[2] For nonyl hydroquinone, the heating period was 24 hours.

|   | A | B | C | D | E |
|---|---|---|---|---|---|
|   |   |   |   |   | Grams |
| Nonyl hydroquinone | 55 g. (0.5 mole) | 63 g. (0.5 mole) of nonene-1 | 68 g. (0.5 mole) | 176–179 at 3 mm | 21 |
| Decyl hydroquinone | 55 g. (0.5 mole) | 70 g. (0.5 mole) of decene-1 | 68 g. (0.5 mole) | 171–174 at 2 mm | 25 |
| Undecyl hydroquinone | 55 g. (0.5 mole) | 77 g. (0.5 mole) of undecene-1 | 68 g. (0.5 mole) | 163–166 at 0.5 mm | 32 |
| Dodecyl hydroquinone | 55 g. (0.5 mole) | 84 g. (0.5 mole) of dodecene-1 | 68 g. (0.5 mole) | 175–185 at 0.5 mm | 53 |
| Tetradecyl hydroquinone | 45 g. (0.332 mole) | 65 g. (0.332 mole) of tetradecene-1 | 45 g. (0.332 mole) | 190–195 at 0.5 mm | 25 |
| Hexadecyl hydroquinone | 55 g. (0.5 mole) | 112 g. (0.5 mole) of hexadecene-1 | 68 g. (0.5 mole) | 200–205 at 0.5 mm | 34 |
| Octadecyl hydroquinone | 55 g. (0.5 mole) | 126 g. (0.5 mole) of octadecene-1 | 68 g. (0.5 mole) | 209–211 at 0.2 mm | 54 |

*Example 2*

Twenty-four grams (0.2 mole) of octene-1, 22 g. (0.2 mole) of hydroquinone and 27.2 g. (0.2 mole) of zinc chloride were placed in 2 Pyrex Carius tubes and the tubes heated in a bomb oven for six hours at 190°. The tarry product was taken up in ether, washed with 5 percent hydrochloric acid and then with water until the wash water remained neutral to litmus. The ether solution was filtered and the ether evaporated to give a dark oil, which was distilled through an unpacked indented 6 inch column to give 5 g. of octyl hydroquinone, boiling point 155–165°/0.5 mm.

*Example 3*

In a 1 liter, three-necked, round-bottomed flask, equipped with an air condenser, mechanical stirrer, and thermometer are mixed 110 g. (1.0 moles) of hydroquinone (356), 140 g. (.75 mole) of lauryl alcohol (873) and 136 g. (1.0 mole) of zinc chloride (anhydrous). The temperature of the flask was raised to 200° by means of an oil bath and kept at 200–210° for twenty hours. The mixture was stirred continuously. After cooling, the reaction mixture was washed with 200 cc. of 5 percent hydrochloric acid and then with water until the wash water was neutral to litmus. Two hundred cubic centimeters of ether was then added and the solution filtered. After washing once with water, the ether was distilled without drying. Approximately 200 cc. of a dark, residual oil was obtained which distilled through an unpacked, indented 6 inch column at 175–185°/0.5 mm. The yield of dodecyl hydroquinone was 40 g. or 19.2 percent. The residue contains didodecyl hydroquinone which boils at 220–225°/0.5 mm.

Our agents are especially useful as gelling agents for liquid aliphatic hydrocarbons boiling between the temperatures 25° C. and 300° C. at 760 mm. of mercury pressure. Even the liquid aliphatic hydrocarbons of the gasoline range (25° C. to 210° C. at 760 mm. of mercury) form rigid gels with small amounts of our agents. The following table contains data which will serve to illustrate such gels.

A 2 percent solution of the dodecyl hydroquinone, i. e., 1,4-dihydroxy-2-(2-dodecyl)-benzene, in gasoline gives a solid gel at 25° C. A 1 percent solution of the same agent in kerosene forms a solid gel at 0°, the gel being fairly stable to temperatures as high as 25° C. One percent solutions of the same agent in higher boiling oils such as highly refined mineral oils, e. g. Takol oil, or vacuum pump oil or spindle oil form rigid gels at 0° C. Upon warming the spindle oil gel, liquefaction takes place at about 25° C. The Takol oil gel and the vacuum pump oil gel, on the other hand, remain in a gel form up to about 30° C.

The most active agents are those containing a secondary alkyl group containing from 9 to 12 carbon atoms. In all cases, those agents in which the secondary alkyl group is linked through its 2-position to the benzene nucleus have proved to be very efficacious. Mixtures of the different agents can be employed and the agents can be employed in conjunction with other compounds, e. g. dialkyl hydroquinones.

The agents can be added to any liquid hydrocarbon to increase the viscosity of the hydrocarbon, for example, to improve lubricating oils. The agents may be used as plasticizers for higher hydrocarbons and for halogenated compounds as well as for higher polymers of special types, such as rubber and other elastomers. Solutions of the secondary octyl, nonyl and decyl derivatives lower the freezing point of benzene and cause the solvent to solidify to a soft, wax-like mass of different nature from that of frozen benzene. The higher alkylated hydroquinones, i. e., the undecyl to octadecyl agents also modify the crystalline structure of frozen benzene so that a wax-like solid is formed.

All of our agents possess antioxidant activity and tend to retard the formation of gum in deteriorable hydrocarbons such as cracked gasoline.

Our agents possess physiological activity and can be used as antiseptics. The secondary octyl, nonyl and decyl derivatives are especially active as indicated by skin tests, 1,4-dihydroxy-2-(2-

*1% solution of agent in petroleum ether*

|   | 0° | 15° | 25° | 30° |
|---|---|---|---|---|
| (2-octyl)-hydroquinone | Cloudy solid gel | Liquid | Liquid | Liquid. |
| (2-nonyl)-hydroquinone | do | Cloudy solid gel | Slightly cloudy solid gel | Semiliquid gel. |
| (2-decyl)-hydroquinone | Solid gel | Solid gel | Solid gel | Do. |
| (2-undecyl)-hydroquinone | do | do | do | Do. |
| (2-dodecyl)-hydroquinone | do | do | do | Do. |
| (2-tetradecyl)-hydroquinone | do | do | Semiliquid gel | Do. |
| (2-hexadecyl)-hydroquinone | do | do | do | Do. |
| (2-octadecyl)-hydroquinone | do | do | do | Do. |

A 2 percent gel of these same agents in petroleum ether is correspondingly more rigid and melts at a higher temperature. Solutions of the agents in ligroin gel more easily than solutions in petroleum ether.

decyl)-benzene being the most active of the entire series.

What we claim as our invention and desire to be secured by Letters Patent of the United States is:

1. A gel of a liquid aliphatic hydrocarbon of the gasoline range and a gelling agent of the following general formula:

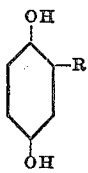

wherein R represents a secondary alkyl group of the formula $C_nH_{2n+1}$ wherein $n$ represents a positive integer of from 8 to 18.

2. A gel of a liquid aliphatic hydrocarbon of the gasoline range and a gelling agent of the following general formula:

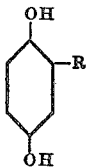

wherein R represents a secondary alkyl group of the formula $C_nH_{2n+1}$ wherein $n$ represents a positive integer of from 8 to 18, said secondary alkyl group being linked through its 2-position to the benzene nucleus.

3. A gel of a liquid aliphatic hydrocarbon of the gasoline range and a gelling agent of the following general formula:

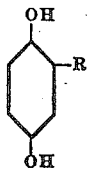

wherein R represents a secondary alkyl group of the formula $C_nH_{2n+1}$ wherein $n$ represents a positive integer of from 9 to 12.

4. A gel of a liquid aliphatic hydrocarbon of the gasoline range and a gelling agent consisting of 1,4-dihydroxy-2-(2-decyl)-benzene.

5. A gel of a liquid aliphatic hydrocarbon of the gasoline range and a gelling agent consisting of 1,4-dihydroxy-2-(2-undecyl)-benzene.

6. A gel of a liquid aliphatic hydrocarbon of the gasoline range and a gelling agent consisting of 1,4-dihydroxy-2-(2-dodecyl)-benzene.

7. A gel of a liquid aliphatic hydrocarbon of boiling point not greater than 300° C. at 760 mm. of mercury pressure and a gelling agent, selected from the compounds of the following general formula:

wherein R represents a secondary alkyl group of the formula $C_nH_{2n+1}$ wherein $n$ represents a positive integer of from 8 to 18.

ARNOLD WEISSBERGER.
JOSEPH LEE LEISERSON.